(12) United States Patent
Juan Andreu (10) Patent No.: US 9,121,388 B2
(45) Date of Patent: Sep. 1, 2015

(54) VERTICAL-AXIS WIND TURBINE

(75) Inventor: Jose Manuel Juan Andreu, Ciutadella de Menorca (ES)

(73) Assignee: DOBGIR, S.L., Ciutadella de Menorca (Illes Balears) (ES)

( * ) Notice: Subject to any disclaimer, the term of this patent is extended or adjusted under 35 U.S.C. 154(b) by 421 days.

(21) Appl. No.: 13/810,576

(22) PCT Filed: Jul. 15, 2011

(86) PCT No.: PCT/ES2011/070520
§ 371 (c)(1),
(2), (4) Date: Feb. 7, 2013

(87) PCT Pub. No.: WO2012/007630
PCT Pub. Date: Jan. 19, 2012

(65) Prior Publication Data
US 2013/0177426 A1    Jul. 11, 2013

(30) Foreign Application Priority Data
Jul. 16, 2010   (ES) .................................. 201031087

(51) Int. Cl.
*F03D 3/06* (2006.01)
*F03D 11/00* (2006.01)
*F03D 3/02* (2006.01)

(52) U.S. Cl.
CPC *F03D 11/00* (2013.01); *F03D 3/02* (2013.01); *F03D 3/064* (2013.01); *F03D 3/067* (2013.01);
(Continued)

(58) Field of Classification Search
CPC ........... F03D 3/00; F03D 3/002; F03D 3/005; F03D 3/02; F03D 3/04; F03D 3/0409; F03D 3/0418; F03D 3/0436; F03D 3/0445; F03D 3/0472; F03D 3/06; F03D 3/061; F03D 3/062; F03D 3/064; F03D 3/065; F03D 3/067; F03D 3/068; F03D 7/06; F05B 2240/21; F05B 2240/211; F05B 2240/212; F05B 2240/213; F05B 2240/214; F05B 2240/215; F05B 2240/216; F05B 2240/217; F05B 2240/218; H02K 7/1823; H02K 7/183
USPC ..................................... 416/132 B, 126, 128
See application file for complete search history.

(56) References Cited

U.S. PATENT DOCUMENTS 3,920,354 A * 11/1975 Decker ......................... 416/117
4,718,821 A    1/1988 Clancy
(Continued)

FOREIGN PATENT DOCUMENTS

EP    1 096 144    5/2001
ES    280 117    6/1985
(Continued)

OTHER PUBLICATIONS

EP Search Report in Application 11806347.8, dated Jan. 9, 2015.

*Primary Examiner* — Nathaniel Wiehe
*Assistant Examiner* — Eldon Brockman
(74) *Attorney, Agent, or Firm* — RatnerPrestia (57) ABSTRACT

Vertical-axis wind turbine composed of first and second independent coaxial rotors (1 and 2), which coincide in the horizontal position, when mounted on one and the same vertical shaft (35), with the ability to rotate in opposite directions. The first and second rotors (1 and 2) bear blades (10 to 13) and (20 to 23) which are articulated to said rotors on non-coinciding vertical shafts (16-26). The blades (10 to 13) and (20 to 23) have curved active surfaces directed, on each rotor, in the same direction but in the opposite direction from the blades of the other rotor.

9 Claims, 8 Drawing Sheets

(52) U.S. Cl.
CPC ......... *F03D 11/0008* (2013.01); *F05B 2240/30* (2013.01); *F05B 2240/40* (2013.01); *F05B 2250/71* (2013.01); *F05B 2260/72* (2013.01); *Y02E 10/74* (2013.01)

(56) References Cited

U.S. PATENT DOCUMENTS

| | | | |
|---|---|---|---|
| 2003/0161729 A1 | 8/2003 | Lindhorn | |
| 2009/0180878 A1* | 7/2009 | Alunni | 416/132 B |
| 2010/0129219 A1* | 5/2010 | Grewal | 416/128 |
| 2010/0135803 A1* | 6/2010 | Grewal | 416/128 |
| 2012/0148403 A1* | 6/2012 | Flaherty et al. | 416/1 |

FOREIGN PATENT DOCUMENTS

| | | |
|---|---|---|
| ES | 1 065 927 | 12/2007 |
| FR | 2 295 258 A1 | 7/1976 |
| FR | 2 811 720 | 1/2002 |
| FR | 2 913 254 | 9/2008 |
| WO | WO 2004/079186 A2 | 9/2004 |
| WO | WO 2004/109097 A1 | 12/2004 |
| WO | WO 2005/100782 | 10/2005 |
| WO | WO 2007/129049 | 11/2007 |

* cited by examiner

VERTICAL-AXIS WIND TURBINE

BACKGROUND AND SUMMARY OF THE INVENTION

This invention relates to a vertical axis wind turbine constructed in such a way that the wind energy captured can be considerably increased for a given rotor size in comparison with conventional vertical axis wind turbines.

It should not be forgotten that VAWT (Vertical Axis wind Turbines) have a number of characteristics that clearly distinguish them from HAWT (Horizontal Axis Wind Turbines), such as they do not require great height above the ground, as a result of which they can be easily concealed in the environment and thus avoid the visual effect produced by the latter, maintenance and damage repair are very much easier than in the case of HAWT as both the generator and the rotor are very close to the ground, the impact on birds is virtually non-existent, the dynamics of the blades are very much simpler and the structure is more reduced, and therefore more economical, the rotation speed is very much slower than in the case of HAWT, which has an effect on both wear in the mechanisms and the noise produced during rotation. Also this noise can be eliminated by making the rotors supported by MagLev (Magnetic Levitation) force, with a correct configuration of the rotors and the mechanisms transmitting movement to the generator it is possible to eliminate the multiplying mechanisms present in HAWT, which are heavy mechanical components very prone to suffering damages, VAWT wind turbines nave a very much lower rotation start speed end a higher safety cut-off speed than HAWT, which means that they can make much greater use of existing winds. Furthermore the configuration illustrated in this document has the ability to fold up all the blades and remain closed (without any blade taking the wind), thus avoiding possible damage when winds are excessively high, without this resulting in damage to the structure of the wind turbine or the supporting structure.

Two reference models have been proposed so far in the concept of vertical axis wind turbines:

The "SAVONIUS" model, developed by the Finnish engineer Sigurd J. Savonius in 1992. Through the special arrangement of its blades this model gives rise to the problem that in the return direction the inactive blades offer great resistance to the wind and this counteracts the effect of the wind on the active blades.

The second model, the "DARRIEUS" model, developed by the French engineer Georges Darrieus, provided a solution to the problem with the "SAVONIUS" model but the excessively small surface area responsible for gathering the force of the wind makes it rather inefficient.

Documents EP 1096144 and FR 2913254 disclose vertical axis wind turbines comprising first and second independent coaxial rotors with the ability to rotate in different directions. Each of the rotors comprises vertically arranged fixed blades. The second rotor is located above the first. The blades of each rotor thus travel in different areas.

Documents ES 1065927U and ES 280117U disclose vertical axis wind turbines comprising first and second independent coaxial rotors with the ability to rotate in different directions. Each of the rotors comprises blades which can be folded on a horizontal axis. The blades of each rotor travel in different areas, and one of the areas is above the other.

In general the vertical axis wind turbines developed so far have been less efficient than horizontal axis turbines.

The purpose of this invention is to overcome the problems stated through a vertical axis wind turbine constructed in such a way that a considerable increase in its efficiency can be achieved, making it comparable with horizontal axis turbines.

The vertical axis wind turbine according to the invention comprises a structure which allows two rotors to rotate simultaneously in the same horizontal plane, in a clockwise direction and an anticlockwise direction. This fact makes it possible to double, in the same space, the energy which the wind produces as it passes through the rotor. In order to achieve this effect the wind turbine blades are deployed or folded depending upon the rotational position in which they are to be found in such a way that while in one direction the rotor blades rotating clockwise are deployed, taking advantage of all the thrust provided by the inertia of the wind, the blades of the other rotor are folded, so that in the first case they do not offer any resistance to the wind and in the second case they do not interfere with the blades of the other rotor rotating in the opposite direction.

The vertical axis wind turbine according to the invention comprises first and second independent coaxial rotors, both having a vertical axis. These two rotors are mounted on the same vertical shaft with the ability to rotate in different directions. The first and second rotors mentioned bear blades which are articulated to the said rotors on non-coinciding vertical axes. These blades have a curved active surface in the same direction for all the blades on each rotor, but in a direction opposite to that of the blades on the other rotor.

This structure allows the two rotors to rotate simultaneously, one of the rotors rotating clockwise and the other anticlockwise. In this way the area swept by the blades on the first rotor can at least partly coincide with the area swept by the blades of the second rotor.

In order to achieve this the blades of the first rotor are preferably articulated to the first rotor through articulated connections located at a greater height than that at which the connections through which the blades of the second rotor are articulated to the second rotor are located.

Through a mechanism, for example based on pinions, the force of the two rotors can be applied to the same output shaft, which will constitute the output shaft of the wind turbine.

Preferably the blades of the two rotors are related to their axes of rotation through opposite edges on one rotor and the other.

Thanks to the articulation of the blades, the blades of the two rotors whose convex surfaces are directed opposite the direction of the wind at any time will be folded in, thus substracting no energy to the rotor. On the contrary those blades whose concave surfaces are directed against the force of the wind will be deployed to receive the full force of the wind.

Folding and unfolding of the blades takes place progressively according to the rotation of the corresponding rotors, and the blades will change from positions having a maximum active orientation to positions having a minimum active orientation.

According to a preferred embodiment the blades of the first rotor are articulated to the rotor through the upper extremity of the axis for articulation of these blades, while the blades of the second rotor are articulated to the second rotor through the lower extremity of the axis articulating the blades of this second rotor.

In an even more preferred embodiment the articulation connections through which the blades of the first and second rotors are articulated are located mid-way up the blades.

These arrangements prevent the blades on one of the rotors from striking those of the other during the operations of folding and unfolding when the rotors rotate in opposite directions.

In one embodiment of the wind turbine according to the invention the first rotor includes an upper annular support to which the articulation axis of the blades of this first rotor is related, for example having the articulation connection for the blades of the first rotor located upon it. For its part the second rotor comprises a lower annular support to which the articulation axis of the blades of the second rotor is related, the articulation connection for the blades of the second rotor being located upon it.

The two annular supports are parallel and coaxial. As already indicated the connection between the blades and the corresponding annular support may be made for example through the mid-point of the articulation axis, through the upper extremity of that axis in the case of the upper support and the lower extremity in the case of the lower support.

The blades have a concave surface on one side and a convex surface on the opposite side. The blades may for example be cylindrical surfaces having vertical axes, all with the same curvature, being related through one of their straight vertical edges to the articulation axis of the corresponding rotor, this edge being the opposite one for the blades of one rotor and the other.

The blades of the two rotors may be located in coincident angular positions on the two rotors.

The arrangement described permits to arrange a vertical axis wind turbine which includes a simple sensor mechanism whereby the blades are folded in when they are on the return path, offering zero resistance to the wind, but deploy when the blades face the effect of the wind, offering total resistance. The mentioned sensor mechanism may comprise merely the articulation of the blades to the rotor in the form already described. Taking advantage of the fact that the blades are folded in for approximately 50% of their path and are folded out for the other approximately 50% it is possible for the two rotors whose blades are folded in and deployed at opposite times or positions to be included in the same mechanism, thus increasing the effectiveness of the wind turbine over approximately 100% of the path of the blades or rotation of the wind turbine. Likewise, the blades may be operated by another type of sensor mechanism, servo motors, guides, etc.

For a better understanding, drawings of embodiments of the wind turbine according to this invention are appended by way of an explanatory but not restrictive example.

DETAILED DESCRIPTION

The constitution and characteristics of the wind turbine according to the invention may be better understood from the following description of some embodiments illustrated in the drawings mentioned above.

Figure 1:
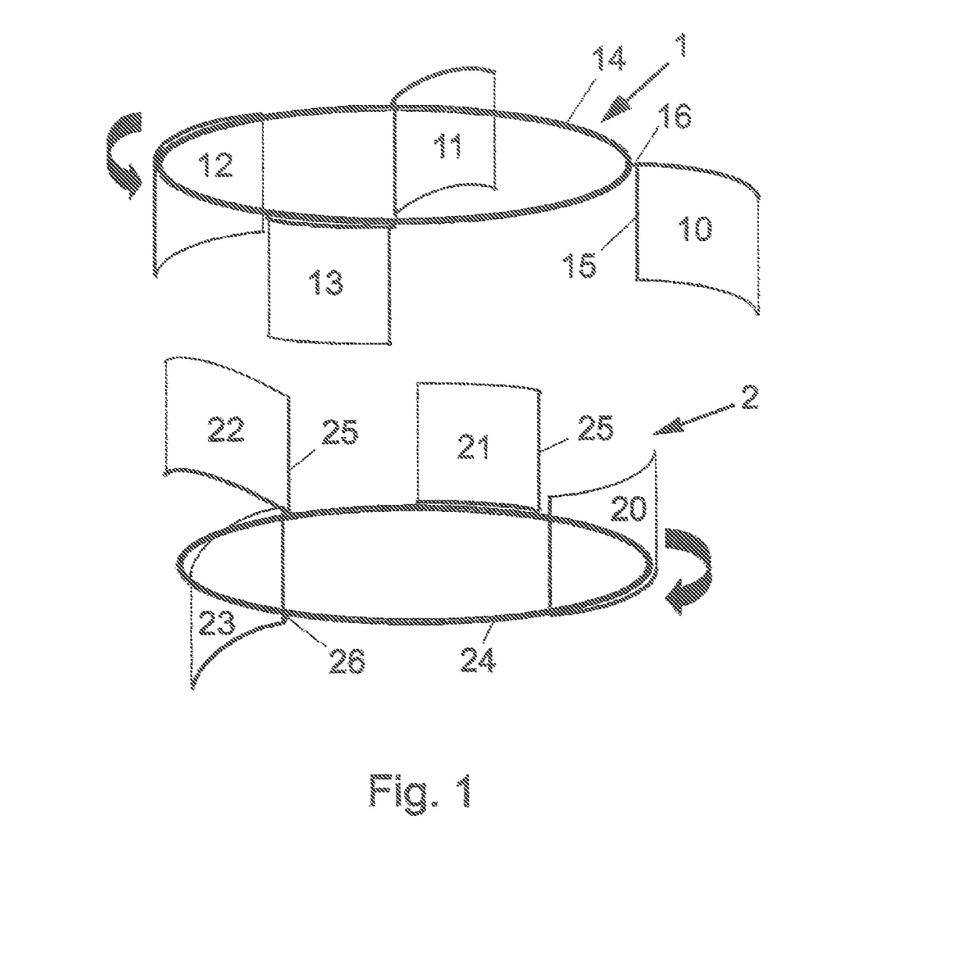
FIG. 1 is a diagrammatical perspective view of the wind turbine according to the invention, with the two rotors comprising it axially separated from each other.

FIG. 1 illustrates a perspective view of a first rotor 1 and a second rotor 2 which form part of the wind turbine according to the invention and which are axially separated from each other. For reasons of explanation and clarity the two rotors have been shown to be an exaggerated distance apart, so that the swept areas of the two rotor blades do not interfere with each other. The first rotor 1 includes a set of blades 10, 11, 12, 13, 14, four in the unit illustrated. For its part rotor 2 includes the same number of blades, 20, 21, 22, 23. The blades of the two rotors have curved surfaces and in the embodiment illustrated these are cylindrical surfaces, the concave sides of the blades in rotor 1 being in the opposite direction to the blades of rotor 2. Rotor 1 rotates anticlockwise and rotor 2 clockwise, as shown by the corresponding arrows.

Rotor 1 includes an annular support 14 onto which the blades are articulated through one of their vertical edges 15 through a vertical axis of rotation or articulation connection 16. For its part rotor 2 includes an annular support 24 with which blades 20, 21, 22, 23 of rotor 2 are related through one of their vertical edges 25 to a corresponding vertical axis of rotation or articulation connection 26.

Figure 2:
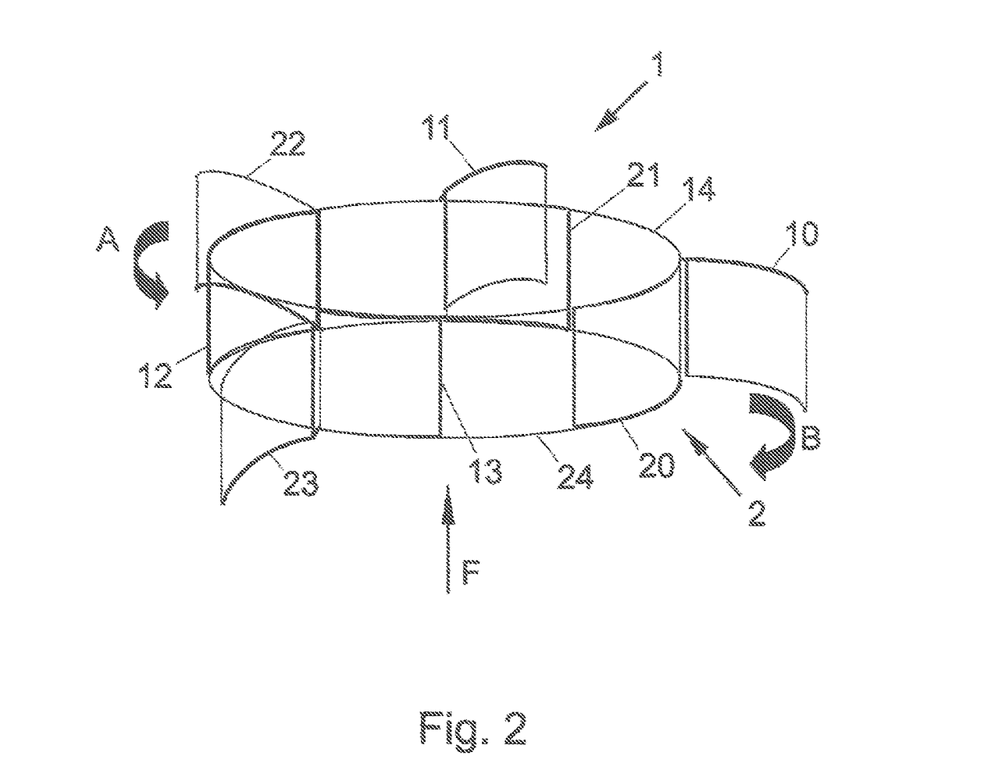
FIG. 2 is a perspective view similar to that in FIG. 1 with the two rotors coupled in a coincident horizontal position.

FIG. 2 illustrates the two rotors 1 and 2 in a coinciding horizontal position, that is to say in such a way that the swept areas of the blades of first rotor 1 and second rotor 2 coincide with parallel supports 14 and 24 located in a coaxial position.

Assuming that the wind blows in direction F and upper rotor 1 rotates in an anticlockwise direction A and lower rotor 2 rotates in a clockwise direction B, blade 10 of rotor 1 will be the one occupying the maximum deployed position, with the concave surface opposite the direction F of the wind. As rotor 1 rotates the blades will become progressively folded in, blade 11 occupying a position of intermediate folding, blade 12 a position close to total folding and blade 13 a position of total folding or closure against rotor 1. Conversely, in rotor 2 rotating in direction B, blade 20 will occupy a fully folded position, blade 21 an almost folded or wholly folded position, blade 22 a position of partial deployment and blade 23 a position of full deployment. In this way the wind having direction F will act effectively against blades 23 and 22 of rotor 2 and against blades 10 and 11 of rotor 1, which will rotate in the opposite direction. Blades 20 and 21 in the folded position will not offer arty resistance to the wind, as will not blades 12 and 13 of rotor 1.

Figure 3:
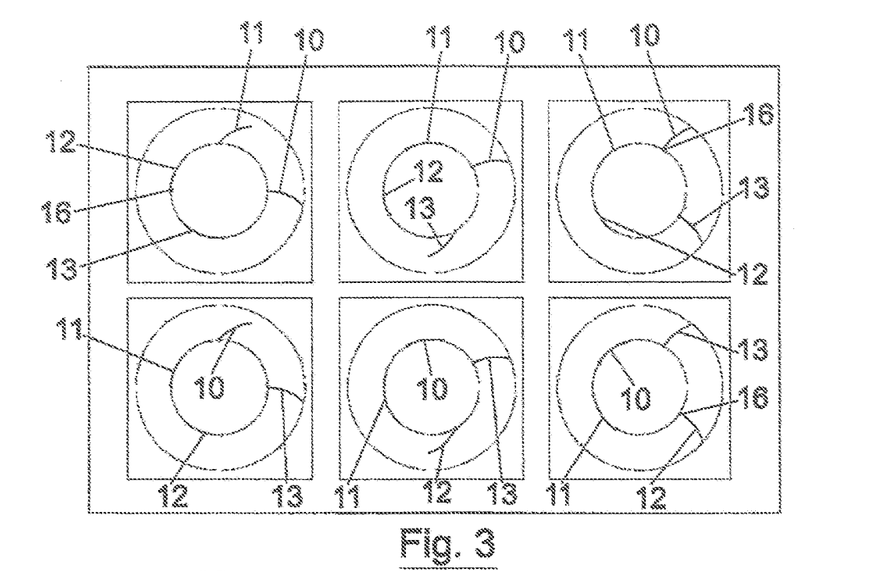
FIGS. 3 and 4 diagrammatically illustrate the rotation of the two rotors in the anticlockwise and clockwise directions respectively.

FIG. 3 shows the movement of rotor 1 which rotates anticlockwise, starting from the position in FIG. 1, with the successive folding and deployment of blades 10-13 with the air acting in direction F in FIG. 2.

Figure 4:
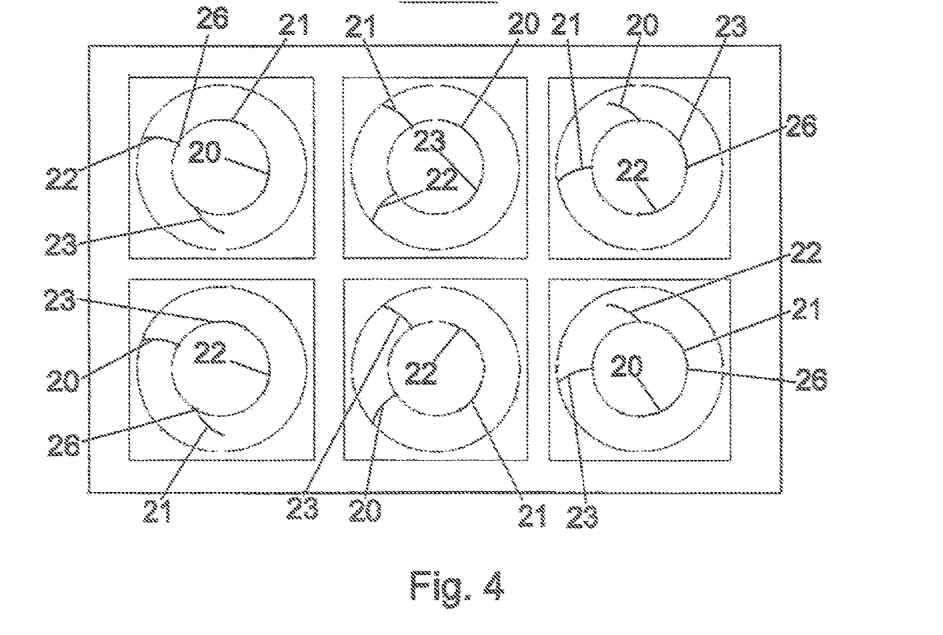

Likewise FIG. 4 shows the movement of rotor 2, rotating in the clockwise direction, with the successive folded and deployed positions of blades 20-23, starting from the position in FIG. 1 with the wind acting in direction F in FIG. 2.

FIGS. 3 and 4 indicate the positions of vertical rotation axes 16 and 26 for rotor blades 1 and 2 respectively.

Figure 5:
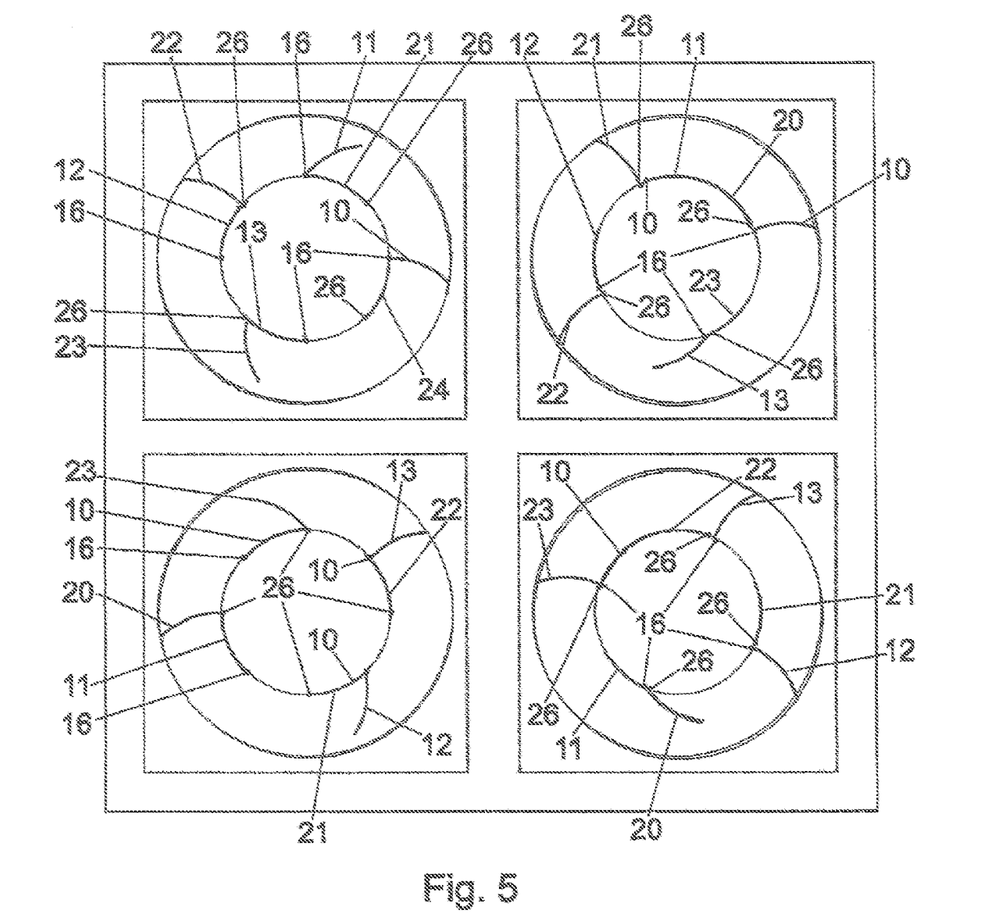
FIG. 5 diagrammatically illustrates the rotation of the two rotors coupled in a coincident horizontal position.

FIG. 5 illustrates the movement of the two rotors 1 and 2 simultaneously, rotor 1 with blades 10 to 13 rotating anticlockwise and rotor 2 with blades 20 to 23 rotating clockwise.

In FIG. 5 reference is made to blades 10 to 13 and 20 to 23 or the two rotors, together with the corresponding rotation axes 16 and 26.

Figure 6:
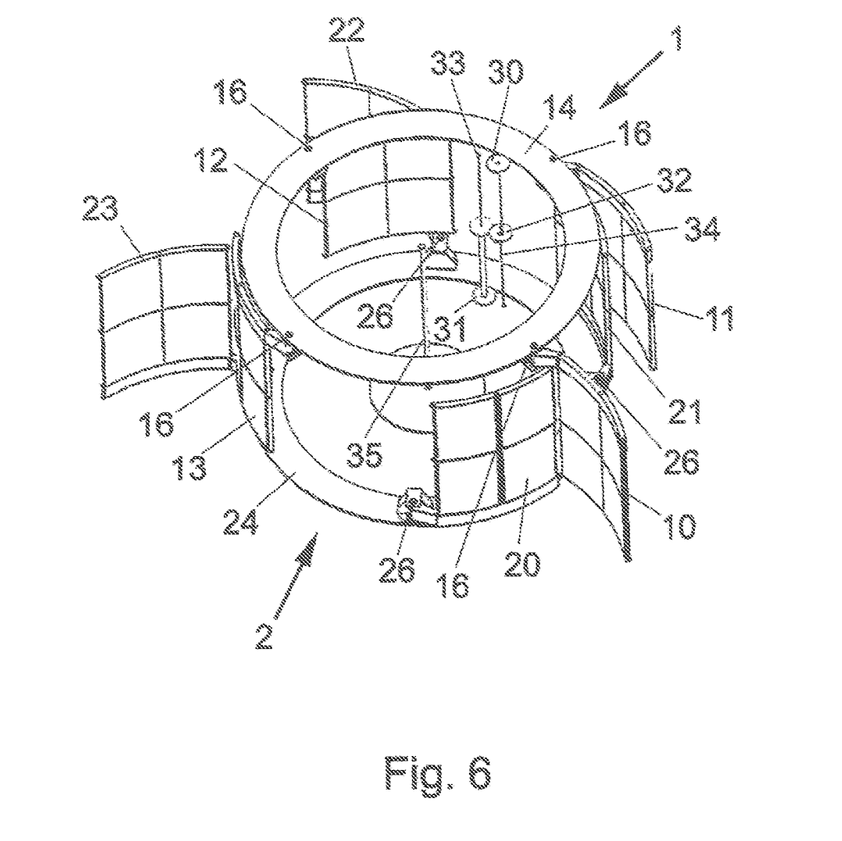
FIG. 6 provides a perspective view of a possible conformation of the wind turbine according to the invention with the two rotors located at the same height.
Figure 7:
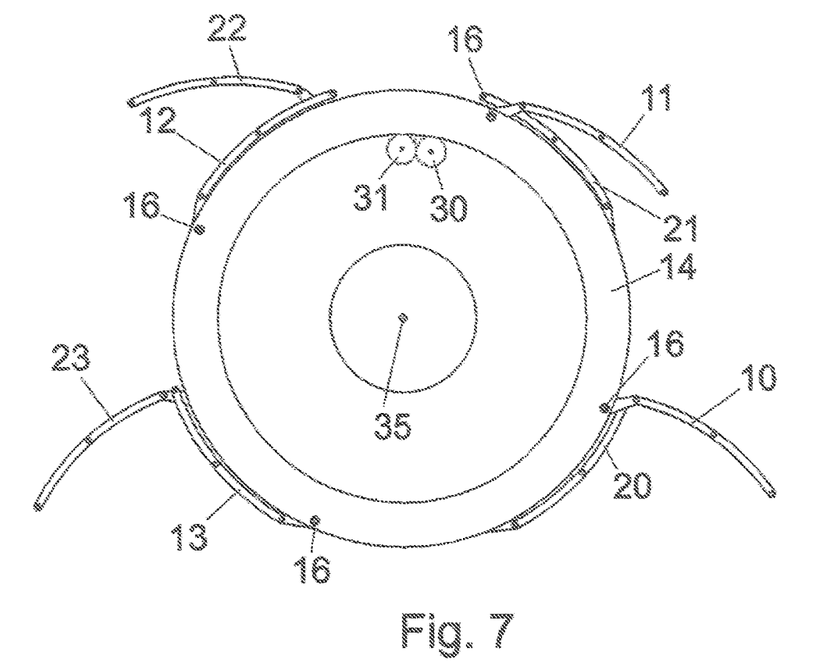
FIG. 7 is a plan view of the wind turbine in FIG. 6.

FIGS. 6 and 7 illustrate a possible embodiment of the wind turbine comprising rotors 1 and 2, each on its corresponding annular support 14 and 24. Blades 10 to 13 are related to support 14 through the upper extremity of vertical articulation axis 16 for these blades. Blades 20 to 23 are related to support 24 through the lower extremity of vertical rotation shaft 26 for these blades. In this way blades 10 to 13 of rotor 1 are articulated to the upper extremity of the corresponding articulation axis, while blades 20 to 23 of rotor 2 are articulated to its lower extremity, thus avoiding the risk of impact between the blades of the too rotors as they fold and unfold.

As illustrated in FIGS. 6 and 7, annular supports 14 and 24 may be toothed and engage wheels 30, 31 whose shafts bear a pair of wheels 32 which engage with each other, all due to the fact that annular supports 16 and 26 rotate in opposite directions. With this arrangement either of shafts 33 or 34 may serve as output shafts from which the power of the wind turbine may be taken off.

Annular supports 14 and 24 are parallel and coaxial, and may be mounted on the same central shaft 35.

In the example described the blades of the two rotors are vertical axis cylindrical surfaces, all having the same curvature, and are related to the corresponding articulation axis through one of their straight vertical edges. These vertical articulation edges are in opposite positions in the blades of one rotor and the other.

Figure 8:
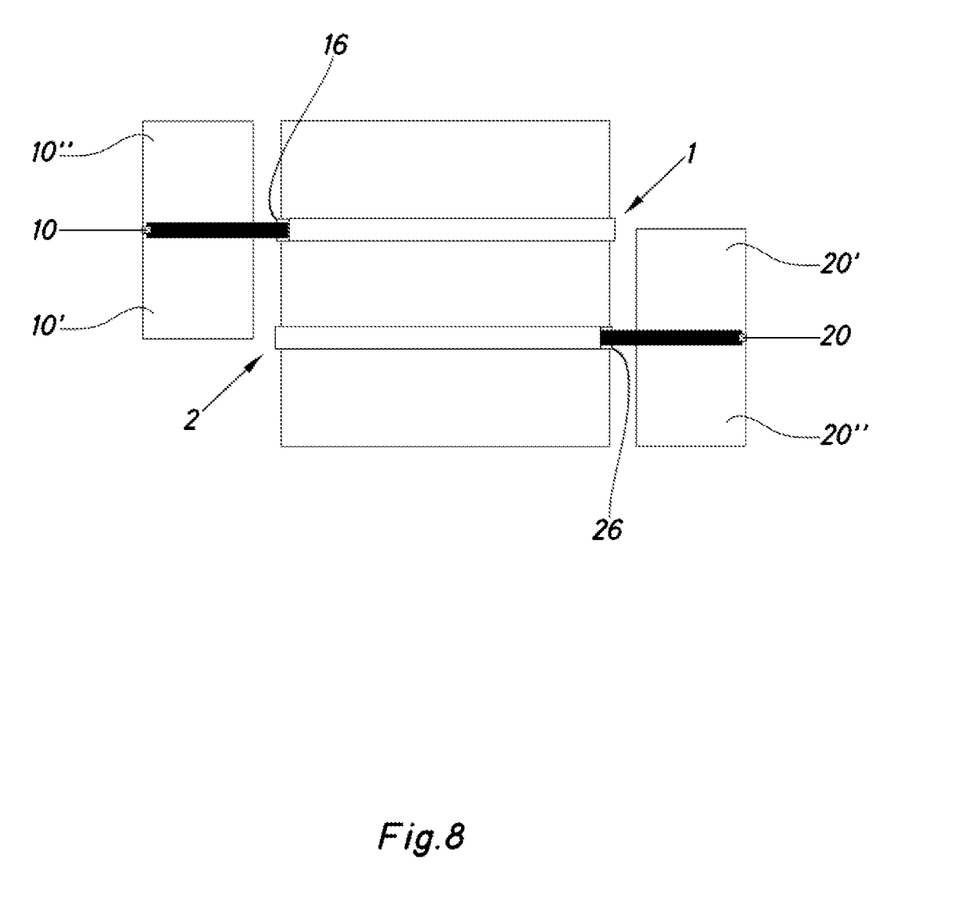
FIG. 8 shows an alternative embodiment in which the blades are articulated to the rotor through a joint located at the mid-points of the blades.

FIG. 8 diagrammatically illustrates an alternative embodiment to that illustrated in FIGS. 1 to 7. The purpose of this embodiment is to reduce the tension forces produced in articulation connections 16, 26 of blades 10, 20 with their corresponding upper annular support belonging to first rotor 1 and lower annular support belonging to second rotor 2 respectively. As may be seen in the figure, connection is made at the mid-point of blades 10, 20 in such a way that an upper portion 10", 20" of the blades lies above the joint and a lower portion 10', 20" of the blades lies below. As may be seen, the swept area of lower portion 10' of blades 10 of upper rotor 1 at least partly coincides with the swept area of upper portion 20' of blades 20 of lower rotor 2. However, as may be seen, utilisation of the area in this embodiment is not 100% as in the prior embodiment, but 67%.

Figure 9:
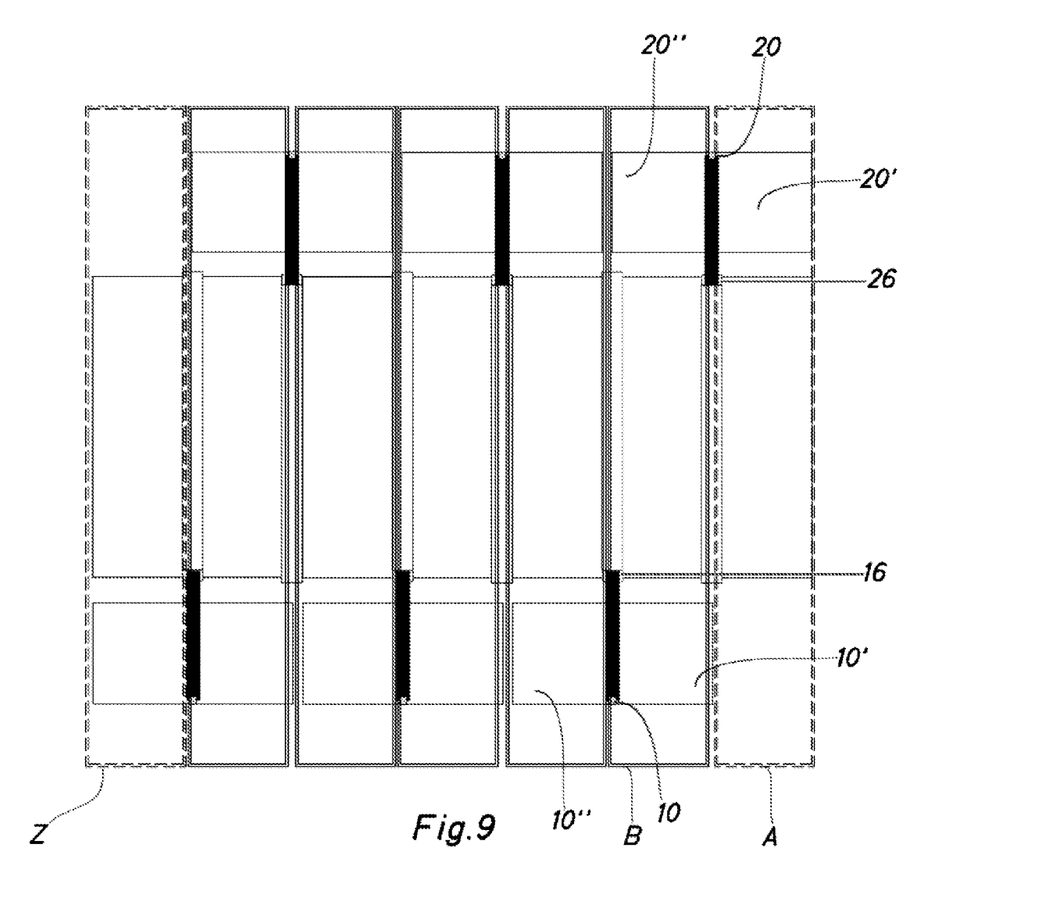
FIG. 9 illustrates an embodiment similar to that in FIG. 8, but with different levels, improving the performance of the device in comparison with that in FIG. 8.

This effect may be minimised by co-locating successive rotors, as may be seen in FIG. 9, in which elements similar to those in FIG. 8 have been identified by the same numbers. In this case use of the lateral surface area is 86%. The different levels of the wind turbine have been delimited by rectangles shown by dashed lines. As may be seen, the wind turbine may also be understood to be a wind turbine according to the embodiment in FIGS. 1 to 7 in which the blades of the supporting ring are joined by their lower edges to the upper edges of the blade of the upper supporting ring at the lower level and the blades of the lower supporting ring are attached by their upper edges to the lower edges of the blade of the lower supporting ring at the higher level.

The invention claimed is:

1. A vertical axis wind turbine which comprises first and second independent coaxial rotors mounted on the same vertical axis, with the ability to rotate in directions opposite to each other, the first and second rotors having blades articulated to those rotors, the blades having a curved active surface directed in the same direction for all the blades on each rotor but in a direction opposite to the blades of the other rotor, characterised in that the blades are articulated to the rotors on non-coinciding vertical axes in such a way that the area swept by the blades of the first rotor coincides at least partly with the area swept by the blades of the second rotor.

2. A wind turbine according to claim 1, characterised in that the blades of the first rotor are articulated to the first rotor through articulation connections located at a greater height than that at which the connections through which the blades of the second rotor are articulated to the second rotor are located.

3. A wind turbine according to claim 2, characterised in that the blades of the first rotor are articulated to the rotor through the upper extremity of the articulation axis for the blades, while the blades of the second rotor are articulated to the second rotor through the lower extremity of the articulation axis for those blades.

4. A wind turbine according to claim 1 or 2, characterised in that the articulation connections mentioned through which the blades of the first and second rotors are articulated are located half-way up the blades.

5. A wind turbine according to claim 1, characterised in that the first rotor comprises an upper annular support on which the articulation connection for the blades of the first rotor is located, and in that the second rotor comprises a lower annular support on which the articulation connection for the blades of the second rotor is located, the two annular supports being parallel and coaxial.

6. A wind turbine according to claim 1, characterised in that the blades have a concave surface on one side and a convex surface on the opposite side.

7. A wind turbine according to claim 1, characterised in that the blades are vertical axis cylindrical surfaces having the same curvature and are related to the articulation axis to the rotor through one of their straight vertical edges, these edges being opposite ones in the blades of one rotor and the other.

8. A wind turbine according to claim 1, characterised in that the blades of one rotor and the other are located in coincident angular positions in the two rotors.

9. A wind turbine according to claim 1, characterised in that the wind turbine has a sensor mechanism to fold the blades in when they are on the return path and to deploy them when their surfaces face the wind.

* * * * *